2,720,577

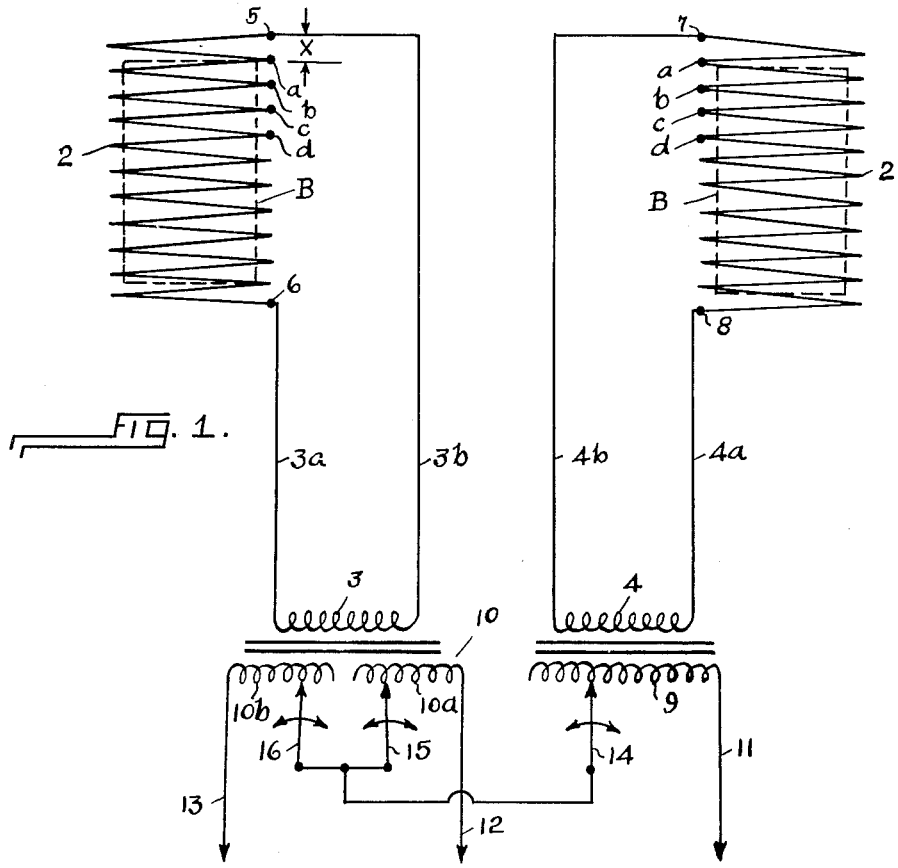
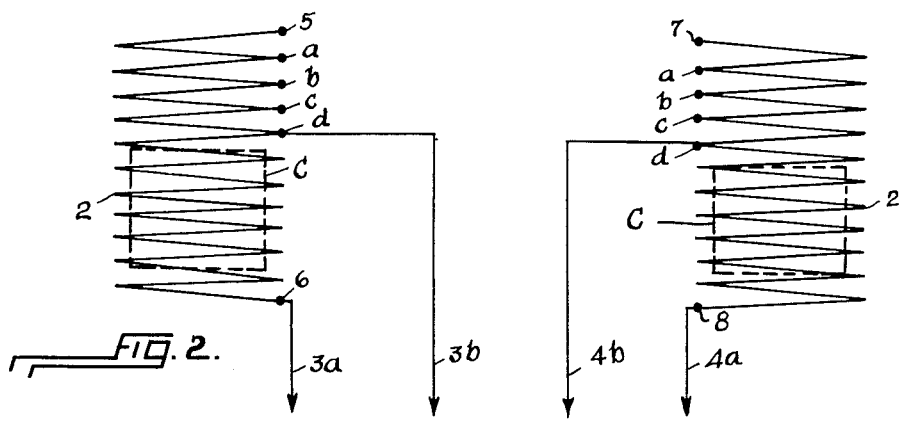
INVENTOR
ROBERT V. LACKNER
by Christy, Parmelee & Strickland
his attorneys

United States Patent Office 2,720,577
Patented Oct. 11, 1955

APPARATUS FOR AND METHOD OF HEATING METAL BILLETS BY ELECTRICAL INDUCTION

Robert V. Lackner, Pittsburgh, Pa., assignor to Loftus Engineering Corporation, a corporation of Maryland Application August 18, 1953, Serial No. 374,840

2 Claims. (Cl. 219—10.75)

My invention relates to the heating of metal billets by low-frequency electrical current, and consists in certain new and useful improvements in apparatus for efficiently heating billets of various lengths in two induction coils energized through a transformer fed with a three-phase power supply system, in which the three phases are maintained in practical balance.

It has been generally recognized that a single-phase coil is effective, when energized with low-frequency (say 60 cycle) current, to heat metal billets with an efficiency upwards of 70%. A practical problem, however, precludes the universal use by industry of individual single-phase coils, particularly where the required electrical power is obtained from existing power plants that furnish three-phase current. The load demand for any industrial application of induction heating is relatively high, and in the case of an individual single-phase coil such load is imposed on only one of the three phases of the power supply, thus seriously unbalancing the power distribution system of the power plant. In consequence of this circumstance, the recent trend of certain of the induction furnace builders has been towards the use of three-phase coils—a three-phase coil being formed of three single-phase coil sections arranged end to end on common axis. Each of the three coil sections is connected to one phase of the power supply, whereby theoretically all three phases of the power supply are balanced. When a three-phase coil is designed for a billet of given diameter and given length the results in service are satisfactory, insofar as the balancing of the three phases of the power supply system is concerned, although the uniformity of heating is not as good as that obtained with a single-phase coil. When, however, the coil is used for billets of different lengths than those for which the coil was designed, there is an objectionable unbalancing of the load as between the three phases of the power supply system. That is to say, when a shorter billet than that for which the coil is designed, is centered, as it should be, on the longitudinal axis of a three-phase coil, the billet extends equally from the opposite ends of the medial coil section partway only into the two end coil sections abutting the opposite ends of the said medial coil section. In consequence the current drawn by the two end coil sections, during the heating of the billet, is substantially less than the current drawn by the medial section, and the two phases of the power supply that are severally connected to the two end coil sections are objectionably unbalanced with respect to the phase that supplies the medial section, and this unbalanced condition of the phases cannot be corrected by tapping the axial outer electrical leads of the end coil sections into the turns of the latter coil sections at points within the outer ends of such sections. Thus, a problem has existed hitherto in the art, and my invention is directed to a solution of the problem.

The object of the invention is to provide low-frequency electrical billet-heating apparatus having two single-phase coils which are adapted efficiently to heat billets of various lengths, while operating on substantially balanced, three-phase power supply.

The invention will be understood upon reference to the accompanying drawings, in which:

Fig. 1 is a diagrammatic view, illustrating a pair of induction heating coils and a transformer for energizing the coils from a three-phase power supply. Two billets of specified diameter and of the maximum length, for which the coils are designed, are indicated in dotted lines in the coils in position for heating; and Fig. 2 is a diagrammatic view of the apparatus as it is adjusted for heating billets of substantially the same diameter, but of less length.

A pair of individual induction billet-heating coils is diagramamtically represented at 2, 2 in the drawings, and the construction of each coil may correspond to the coils disclosed in structural detail in my copending patent applications Serial No. 329,390, filed January 2, 1953, and Serial No. 340,209, filed March 4, 1953.

As disclosed in said copending patent application the coils 2, 2 are formed of water-cooled copper conductor bar. In each coil the adjacent turns of the coil are separated only by interposed electrical insulation. A wear resistant liner is secured within the tube formed by each coil, and the tube and its liner correspond in cross section to the billets to be heated therein. In length the tube or coil exceeds the longest billet to be heated by a distance $x$ at each end, $x$ varying from 1½" to 4", or more, depending upon the diameter or thickness of the billets to be heated. The billet which each coil is designed to heat to extrusion, or forging, or rolling temperature, is indicated in dotted lines at B.

The terminels (5, 6 and 7, 8) of each coil are connected to the two secondaries 3 and 4 of a conventional Scott transformer arrangement or assembly, whose primaries are indicated at 9 and 10. The end terminals 5 and 6 of one coil are connected by conductors 3a and 3b to the secondary 3, while the corresponding terminals 7 and 8 of the other coil are connected by conductors 4a and 4b to the secondary 4, as shown in Fig. 1 of the drawing. The transformer primary 9 comprises a single coil connected at one of its two terminals by a feeder 11 to one phase of a three-phase conventional low-frequency power supply. The transformer primary 10 comprises two coil sections 10a and 10b, coil section 10a being connected at one of its terminals by a feeder 12 to the second phase of the power supply, and the coil section 10b being connected at one of its terminals by a feeder 13 to the third phase of the said power supply. The second terminal of each of the primary coil components comprises a tap-changing contactor, the tap-changing contactor for coil 9 being shown at 14, the one for coil section 10a being shown at 15, and that of the coil section 10b being shown at 16. The three tap-changing contactors 14, 15, 16 are bridge connected, as indicated, and all three may be adjusted in unison, or each may be adjusted individually. By such adjustment the transformer ratio betwen primaries and secondaries is varied, thereby regulating the power input to the two induction coils. By virtue of the arrangement the two induction coils are uniformly energized and operate with uniform effect, to cause current to flow in the bodies of the billets B and to generate heat therein in known way, until the billets are heated to desired temperature, whereupon the electrical power is switched off and the billets removed from the coils and passed to the extrusion press or other metal-working apparatus intended to receive it. The conditions of equilibrium are made readily possible in the apparatus because the billets are centered in each coil 2, with the same mass of metal lying within each of the coils. The described regulation of the power input to the two induction coils in turn regulates the rate of heating the billets, and it is important to note that the adjustment of the tap-changing contactors permits variations or regulations of the power applied to one coil with respect to the other.

As already mentioned the billets B are of the maximum length for which the coils 2 are designed. A feature of my present invention resides in the adaptability of the coils 2 to heat billets shorter than the billets B, while permitting a uniform balance to be established and maintained among the three phases of the power supply. In combination with the Scott transformer arrangement, I provide on each coil 2 a series of taps $a$, $b$, $c$, $d$, etc., extending inwardly from the end terminals 5 and 7 of the two coils, and by virtue of these taps the connections to the secondaries 3 and 4 of the transformer arrangement may be made at selected points in the coils within the said terminals 5 and 7. Thus, the electrical length of each induction coil may be varied, and varied symmetrically with respect to the central transverse plane of the coil. Thus, the effective or electrical length of each induction coil may be adjusted to billets of various lengths less than the length of the billets B. I am aware that it is not unusual to provide series taps on various sorts of electrical coils, but so far as I am aware no one has hitherto provided such taps symmetrically on the two coils in combination with a transformer arrangement for utilizing a three-phase, low-frequency power supply while keeping all three phases in substantial balance.

In Fig. 2 relatively short billets C are shown positioned centrally in the coils 2, and the inner terminals of the secondaries 3 and 4 (Fig. 1) of the transformer arrangement are connected by conductors $3b$ and $4b$ to the taps $d$, $d$ of the coils 2. The electrical length of each of the coils 2 is now equal to the distance between the taps $d$ and the terminals 6 and 8, respectively, and it will be perceived that the billets C are each located precisely at the center of such electrical length, with the said electrical length exceeding the billet length at each end by the required distance. The transformer contacts are now adjusted, if need be, to establish a phase balance of the current flowing in the three feeders 11, 12 and 13, and of the current flowing in the two coils. The billets C may thus be heated uniformly with power derived from a balanced three-phase system.

The apparatus, manifestly, may be adjusted to heat billets of greater or less length than the billets C but within the length of the billets B.

Great practical advantages are realized in consequence of the apparatus and method of my invention. The electrical efficiency of my apparatus in the case of heating aluminum billets is approximately 68 per cent, whereas the corresponding efficiency of an individual single phase coil is approximately 70 per cent. For all practical purposes, therefore, the practice of my invention yields substantially all of the advantages of an individual single-phase coil for heating billets of various lengths, without the serious disadvantages of unbalancing the three-phase power supply system. The disadvantages of three-phase coils are eliminated.

I claim:

1. An induction furnace for heating metal billets to working temperature, said furnace comprising two induction coils each having a wear-resistant liner secured within it to form a tubular container for the billets to be heated, each of said coils having a tap adjacent to each end of the coil and at least one additional tap intermediate said end taps, a Scott transformer arrangement having two secondary coils each having two terminals, one end terminal of each heating coil being connected to one terminal of one of said transformer secondary coils, the other terminal of each transformer secondary coil being connected to one of the other taps of the heating coils respectively, said transformer arrangement having three primary coil portions, one for each phase of a three-phase, low-frequency power supply system for exciting said two secondary coils of the transformer arrangement, with the transformer ratio between said primary and secondary coils established at a value to balance the currents flowing in the three phases, whereby substantially equalized current flow may be induced in the billets in the two tubular containers formed within said coils and the billets therein heated to working temperature.

2. An induction furnace for heating metal billets to working temperature, said furnace comprising two induction coils each having a wear-resistant liner secured within it to form a tubular container for the billets to be heated, each of said coils having a tap adjacent to each end of the coil and at least one additional tap intermediate said end taps, a Scott transformer arrangement having two secondary coils each having two terminals, one end terminal of each heating coil being connected to one terminal of one of said transformer secondary coils, the other terminal of each transformer secondary coil being connected to one of the other taps of the heating coils respectively, said transformer arrangement having three primary coil portions, one for each phase of a three-phase, low-frequency power supply system for exciting said two secondary coils of the transformer arrangement, and means for adjusting the transformer ratio between said primary and secondary coils of the transformer arrangement to balance the currents flowing in the three phases, whereby equalized current flow is induced in the billets in said two tubular containers and the billets therein heated to working temperature.

References Cited in the file of this patent

UNITED STATES PATENTS

| | | |
|---|---|---|
| 783,651 | Thomson | Feb. 28, 1905 |
| 1,430,987 | Hanff | Oct. 3, 1922 |
| 1,566,500 | Northrup | Dec. 22, 1925 |
| 1,926,811 | Long | Sept. 12, 1933 |
| 2,616,071 | Hibbard | Oct. 28, 1952 |
| 2,623,081 | Schorg | Dec. 23, 1952 |